(12) United States Patent
Jacumet et al.

(10) Patent No.: US 8,471,955 B2
(45) Date of Patent: Jun. 25, 2013

(54) METHOD AND DEVICE FOR CONTROLLING THE CONTRAST RANGE OF AN IMAGE CAPTURING LIGHT FALLING ON AN IMAGE CAPTURING MEDIUM

(75) Inventors: Klaus Jacumet, Munich (DE); Volker Bahnemann, Greenwich, CT (US); Peter Giegerich, Munich (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 473 days.

(21) Appl. No.: 12/673,474

(22) PCT Filed: Aug. 11, 2008

(86) PCT No.: PCT/EP2008/060507
§ 371 (c)(1),
(2), (4) Date: Feb. 12, 2010

(87) PCT Pub. No.: WO2009/021932
PCT Pub. Date: Feb. 19, 2009

(65) Prior Publication Data
US 2011/0194021 A1  Aug. 11, 2011

(30) Foreign Application Priority Data
Aug. 13, 2007  (DE) .......................... 10 2007 038 899

(51) Int. Cl.
*H04N 5/225* (2006.01)
*G03B 15/00* (2006.01)
(52) U.S. Cl.
USPC .............................. 348/370; 362/8

(58) Field of Classification Search
USPC .................... 348/370, 371; 358/475; 362/11, 362/13, 3, 8; 396/199
See application file for complete search history.

(56) References Cited

U.S. PATENT DOCUMENTS

| 4,900,131 | A | 2/1990 | Bahnemann et al. | |
| 7,355,648 | B1* | 4/2008 | Braun et al. | 348/370 |
| 2003/0218688 | A1* | 11/2003 | Shaw et al. | 348/370 |
| 2004/0135912 | A1 | 7/2004 | Hofflinger et al. | |
| 2007/0262236 | A1* | 11/2007 | Pertsel | 250/208.1 |
| 2009/0185358 | A1* | 7/2009 | Liu et al. | 362/3 |

FOREIGN PATENT DOCUMENTS

| DE | 39 42 822 C2 | 6/1991 |
| EP | 0 102 172 A2 | 3/1984 |
| EP | 0 414 109 A2 | 2/1991 |
| EP | 1 404 119 A1 | 3/2004 |

OTHER PUBLICATIONS

International Search Report, dated Feb. 23, 2009, corresponding to PCT/EP2008/060507.

* cited by examiner

*Primary Examiner* — Jason Whipkey
(74) *Attorney, Agent, or Firm* — Christie, Parker & Hale, LLP

(57) ABSTRACT

A method for controlling the contrast range of the image recording light falling on an image recording medium by means of control light coupled into the optical path of the image recording light, which is composed of several base colors whose brightness is adjusted independent of each other, is provided. The brightness at least of those base colors of the control light is varied, whose dynamics in the recorded image go beyond the admissible dynamic range.

20 Claims, 6 Drawing Sheets

METHOD AND DEVICE FOR CONTROLLING THE CONTRAST RANGE OF AN IMAGE CAPTURING LIGHT FALLING ON AN IMAGE CAPTURING MEDIUM

CROSS-REFERENCE TO A RELATED APPLICATION

This application is a National Phase Patent Application of International Patent Application Number PCT/EP2008/060507, filed on Aug. 11, 2008, which claims priority of German Patent Application Number 10 2007 038 899.5, filed on Aug. 13, 2007.

BACKGROUND

This invention relates to a method and an apparatus for controlling the contrast range of the recording light falling on an image recording medium.

When taking pictures with film-based or electronic still cameras or when recording image sequences by means of a motion picture or video camera, great differences in brightness can occur in the object, i.e. a great dynamic range in the object to be recorded, for example in the case of regions with intensive sunlight and very dark shades. This dynamic range can be much greater than the technically realizable dynamic range of an image recording medium, for example of a light-sensitive film material or of electronic image sensors in the form of CCD or C-MOS video sensors. The various image recording media have dynamic or contrast ranges of different sizes admissible for the recorded image and greatly differ in their behavior when exceeding the admissible range.

While a color negative film has a very large dynamic range and hence a very large contrast range and its characteristic slowly levels off, so that even when exceeding the admissible range and hence in the case of over- and underexposures, corresponding image information can still be stored on the color negative film, so that this film material generally is unproblematic in the case of very great differences in brightness of an object, electronic image sensors have a very much smaller dynamic range. What complicates things with electronic image sensors is the fact that their linear sensitivity characteristic does not level off slowly, but abruptly bends down upon reaching the maximum saturation. An electronic processing of the converted image signals emitted by electronic image sensors by means of signal amplification or gamma correction neither leads to a significant expansion of the dynamic range of the electronic image sensors, but only to a negative influence on other parameters, for example to an amplification of noise signals.

Another method known under the term "Correlated Double Sampling" is very complex in electronic terms, and can be performed only with moderate success in particular when recording moving images, because of the required double recording and the changing locations of the objects due to the movement.

Another possibility to take into account the limited dynamic and contrast ranges in particular of electronic image sensors consists in lightening dark regions of the object to be recorded by means of mirrors or lampheads, which involves, however, a considerable amount of time and effort.

From U.S. Pat. No. 4,900,131 a camera attachment with a means for reducing the contrast range is known, which consists of a glass pane with a plurality of light sources distributed around the periphery of the glass pane, which couple light into the plane of the glass pane, which light is reflected inside the glass pane and thereby provides for controlling the contrast range of the object to be recorded without impairing the resolution of the recorded image. For uniform illumination of the glass pane and hence of the image to be recorded, the light sources are arranged in the vicinity of the periphery of the glass pane, whose peripheral surface is polished and mirrored with the exception of the portions opposite the light sources, in order to prevent an exit of light via the peripheral surface, whereas the planar surfaces of the glass pane are provided with an anti-reflection coating, in order to achieve a maximum transparency for the image recording optical path from the object to be recorded.

A disadvantage of the known apparatus for contrast reduction is the coupling in of a light mixture whose spectral distribution or color temperature depends on the type of light source used and its temperature, so that it is possible to selectively influence the light output of the light source by feeding the light source with a variable voltage without changing the color temperature, but the efficiency of the light coupling for contrast reduction of the recorded image furthermore is limited in that individual colors of the light mixture can go beyond the admissible dynamic range and hence determine the total dynamic range of the recorded image, while the contrast range of other colors still lies within the admissible dynamic range.

SUMMARY

Therefore, it is the object underlying the present invention to provide a method and an apparatus for controlling the contrast range of the image recording light falling on an image recording medium, which provide for an optimum adjustment or control of the contrast range of the image recording medium.

Since the control light coupled into the image recording optical path is composed of a plurality of base colors whose brightness is independently adjustable, an optimum adjustment or control of the contrast range of the image recording medium becomes possible.

The solution in accordance with the invention is based on the idea to achieve a much greater flexibility by independently adjusting the brightness of individual base colors of the control light, so that those base colors can selectively be varied whose dynamics in the recorded image go beyond the admissible dynamic range.

Accordingly, an advantageous aspect of the method of the invention consists in varying the brightness of at least that base color of the control light which in the image recording light exceeds an admissible dynamic range.

To be able to use the method of the invention with different image recording media, nominal values for the brightness of the base colors and/or for the light flux portions of the base colors in the light mixture of the control light are stored for a standard setting of the control light in dependence on the spectral sensitivity of the image recording medium.

By storing spectral sensitivity curves of different image recording media, i.e. of different film materials or different electronic image sensors, the best spectral distribution for the respective recording medium can be specified and hence the contrast range and the dynamic range of the respectively used image recording medium can be optimized.

An exemplary development of the method of the invention consists in that even if a certain spectral distribution is specified by selecting an image recording medium, a spectral distribution of the control light deviating from the standard setting is adjusted by entering nominal correction values.

By adjusting the total brightness of the control light composed of the base colors, in particular in dependence on the object to be recorded and the contrast range of the image recording medium, a further optimization of the contrast range is achieved for the respective image recording medium used, and hence the different circumstances during use of film material or electronic image sensors as image recording medium are taken into account.

Exemplary, the base colors of the control light are emitted by partial light sources which are associated to the individual base colors, wherein the brightness and/or the light flux portions of the base colors of the control light is/are adjusted by controlling the electrical power supplied to the partial light sources.

By dividing the light source emitting the control light into a plurality of partial light sources, which each emit one of the base colors of the control light, an optimum control of the brightness of the individual base colors of the control light and hence of the respective light flux portion of the base color in the light mixture of the control light is ensured.

As an alternative to the control of the brightness by specifying selected parameters, the brightness of the individual base colors can be regulated in that the brightness of the individual base colors of the control light falling on the image recording medium is detected and deviations from the nominal values are corrected.

By using sensors which actually determine the brightness of the individual base colors, differences in the light sources generating the control light or in the total brightness generated by the partial light sources can be detected and compensated by nominal/actual value comparisons. By using a contrast regulating unit instead of a contrast control unit, it can thus be ensured that the effect of different contrast regulating units is standardized, i.e. the nominal values tailored to the various parameters are maintained independent of the respective contrast regulating unit used.

Instead or in addition to the composition of the control light of the base colors, the control light can be generated by at least one LED emitting white light, wherein the LED generates light in the base colors, from which white control light is generated by light mixture, i.e. both an individual light source and a plurality of partial light sources is/are formed as LEDs emitting white light, which internally first generate light in the individual base colors, for example red, green and blue, but mix the light such that white light is obtained and is emitted as control light.

Exemplary, the electrical power supplied to the partial light sources is controlled by pulse width or pulse pause modulation, whereby the individual partial light sources can be actuated with constant current with a minimum consumption of energy.

By choosing a frequency of the pulse width or pulse pause modulation many times higher than the image recording frequency upon actuation of the partial light sources, brightness fluctuations caused by the control light in the image recording optical path and hence on the film to be exposed or on the electronic image sensor of the image recording medium are avoided.

In an exemplary embodiment, the base colors of the control light consist of the colors red, green and blue.

An apparatus solving the object for controlling the contrast range of the image recording light falling on an image recording medium with a light-permeable element which is arranged in the image recording optical path in front of a lens of an image recording device and in which control light emitted by at least one light source can be coupled in is characterized in that the control light is composed of a plurality of base colors whose brightness is independently adjustable.

By independently adjusting the brightness of the individual base colors, of which the control light coupled into the image recording optical path is composed, and by coupling the same into the image recording optical path a maximum of flexibility is achieved when utilizing the contrast range of the image recording medium specified by selection of the image recording medium, since the base colors of the control light can selectively be varied, whose dynamics in the recorded image go beyond the admissible dynamic range.

Exemplary, the light source at least includes a number of partial light sources corresponding to the number of base colors, and a central control unit of a contrast control unit controls the brightness of the partial light sources and stores nominal values of the brightness of the individual base colors emitted by the partial light sources and/or light flux portions of the individual base colors in the light mixture of the control light.

By dividing the light sources at least into a number of partial light sources corresponding to the number of base colors it is possible to individually control the light mixture of the control light of the individual base colors with a high flexibility and hence optimally adjust the contrast range or dynamic range of the image recording medium. The number of partial light sources need not correspond to the number of base colors, but can also be greater than the number of base colors, for example when the base colors have a different percentage share in the light mixture of the control light and accordingly each base color has an assigned share in the partial light sources.

Nominal values for the base colors and/or a spectral distribution of the base colors suitable for the respective image recording medium are provided to signal inputs of the central control unit by a presetting unit.

The adjustment of the nominal values for the base colors stored in the central control unit and/or a spectral distribution of the base colors suitable for the respective image recording medium is effected either at signal inputs of the contrast control unit via potentiometers associated to the base colors, or via an external control unit in which the spectral color sensitivity, in particular the color temperature and color rendering, of various image recording media are stored and which provides a selected spectral distribution associated to the respective image recording medium to the contrast control unit.

In the external control unit, the spectral sensitivity curves of different film materials or of different electronic image sensors can be stored, and thus the best spectral distribution for the respective image recording medium can be specified for the control light. The external control unit can either be operated as a function element with corresponding control modules especially assigned to this task, or can be configured as a computer, palm-top or the like, which are operated with a corresponding software.

In the case of a specification by preselection of a corresponding image recording medium by means of an input into the external control unit it is also independently possible to specify a spectral distribution of the control light composed of the base colors deviating from the standard setting by means of the potentiometers connected to the signal inputs of the central control unit.

The interface between the central control unit and the external control unit can be configured as a serial interface or as a wireless interface.

In addition, the central control unit can be actuated via a control means in particular configured as a further potentiometer, which specifies the total brightness of the control light. The setting of the further potentionmeter in particular depends on the differences in the brightness of the light reflected by the object to be recorded and thus is dependent on the motif to be recorded and the dynamic range of the image recording medium.

In a further exemplary aspect of the inventive apparatus for controlling the contrast range of the image recording light falling on an image recording medium, the output of the central control unit is connected with a driver stage which is connected to a constant-current source or includes a constant-current source and which controls the current delivered to the partial light sources in dependence on the control signals emitted by the central control unit to the driver stage.

The driver stage converts the setting variables specified by the central control unit for the individual base colors into the currents necessary for the partial light sources, in that the current of a constant-current source is regulated to the desired value in the driver stage. To minimize the energy consumption of the partial light sources, a quasi constant current can optionally also be generated by means of pulse pause or pulse width modulation, and to avoid brightness fluctuations in the recorded image the switching frequency of a pulse pause or pulse width modulation must be chosen very much higher than the image recording frequency with which the image recording medium is exposed.

Alternatively, the light source can consist of an LED emitting white light or the partial light sources can consist of LEDs emitting white light, which internally generate light in the base colors, which is mixed to obtain white light.

In an exemplary embodiment, the light-permeable element consists of a glass pane around whose periphery a plurality of light sources are distributed, which couple the control light into the plane of the glass pane such that at least part of the control light is reflected into the image recording optical path, wherein for the uniform distribution of the control light between that light source and the edge of the glass pane a diffuser is arranged.

By connecting the central control unit with a sensor means which contains a number of sensors corresponding to the number of base colors, which provide sensor signals corresponding to the base colors to the central control unit, the brightness of the individual base colors actually is determined, namely within the light-permeable element or the glass pane or at right angles thereto in the direction of the image recording device, i.e. in the direction of the image recording optical path. The sensors either detect the control light of the partial light sources coupled into the light-permeable element or the control light of the partial light sources reflected into the image recording optical path.

Due to this expansion, the contrast control unit becomes a contrast regulating unit, by means of which differences in the light sources emitting the control light or the partial light sources emitting the base colors of the control light can be detected and deviations can be compensated by comparing the detected actual values with the nominal values taking into account the various parameters. As a result, specific characteristics of each contrast regulating unit are taken into account and the effect of the contrast regulating units is standardized independent of these specific particularities.

The control light can be composed of a plurality of partial light sources emitting the base colors or white light by means of light-emitting diodes or LEDs, by means of semiconductor lasers or by means of base colors emitted by a multicolor light-emitting diode. Alternatively, the partial light sources can consist of a plurality of filter elements filtering out the base colors and of a common light source emitting a light mixture.

By combining at least the light source or the partial light sources and the light-permeable element to a structural unit arranged in front of the lens with a frame enclosing the light-permeable element and containing the light source or the partial light source, a universally applicable structural unit retrofittable in one possible embodiment is created, which can be used in conjunction with different image recording devices and in particular with an attachment such as a compendium connected with the image recording device or a filter holder connected with the lens.

By connecting the apparatus for controlling the contrast range with a filter holder, a filter, preferably a neutral-density filter (ND-filter) can additionally be used, with which a higher flexibility of the contrast control device is achieved, in that the ND-filter arranged in front of the apparatus for controlling the contrast range lowers the contrast range of the object to be recorded when the scenic contrast exceeds the working range of the apparatus for controlling the contrast range, so that the contrast again lies in the working range of the apparatus for controlling the contrast range.

A neutral-density filter or neutral or grey filter consists of homogeneously neutral-grey colored glass or plastic panes of optical quality by means of which the amount of light transmitted is reduced and thereby uniform darkening is achieved in the recorded image.

By additionally arranging a sunshade in front of the structural unit and fastening the same with the lens of the image recording device, the apparatus for controlling the contrast range is universally applicable for any type of image recording device.

BRIEF DESCRIPTION OF THE DRAWINGS

With reference to an embodiment illustrated in the drawing further features, properties and advantages of the invention will be explained in detail.

DETAILED DESCRIPTION

Figure 1:
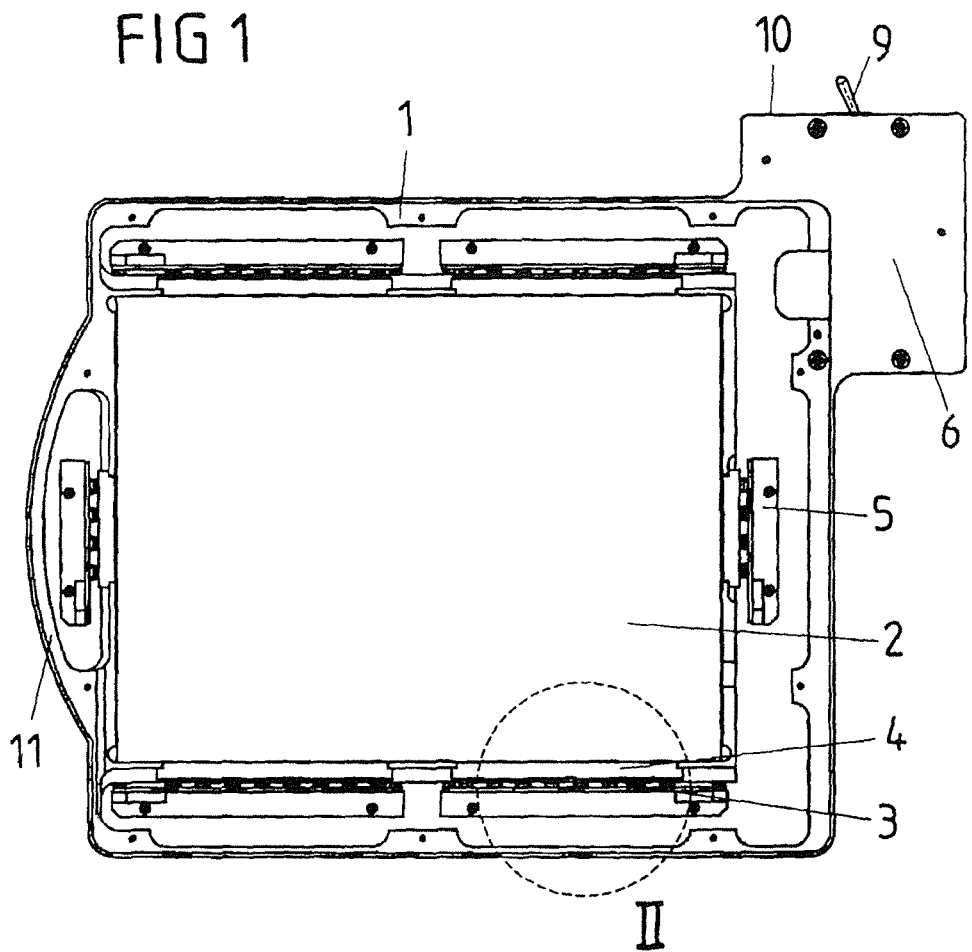
FIG. 1 shows a top view of an apparatus for controlling the contrast range of the image recording light falling on an image recording medium with a glass pane and light sources distributed around the periphery of the glass pane and composed of a plurality of LEDs.
Figure 2:
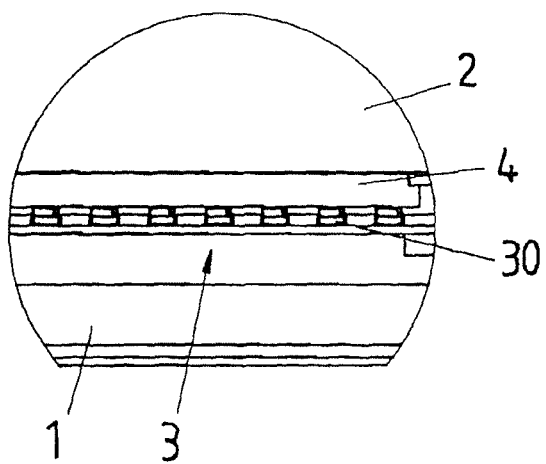
FIG. 2 shows an enlarged view of the part II of FIG. 1.
Figure 3:
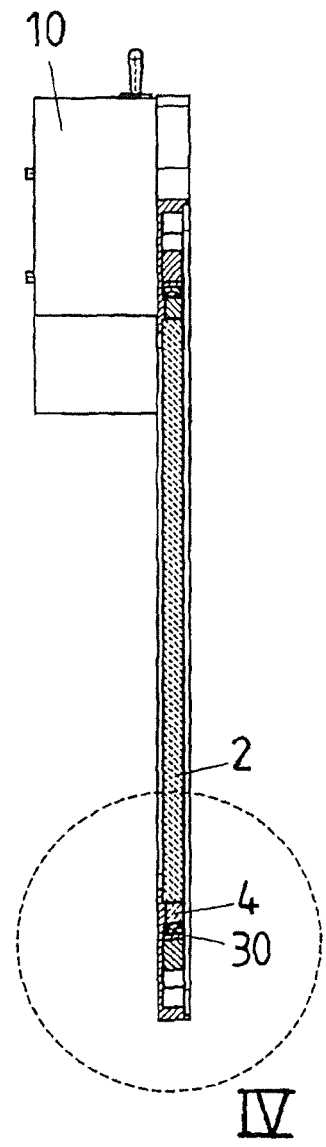
FIG. 3 shows a longitudinal section through the apparatus of FIG. 1.
Figure 4:
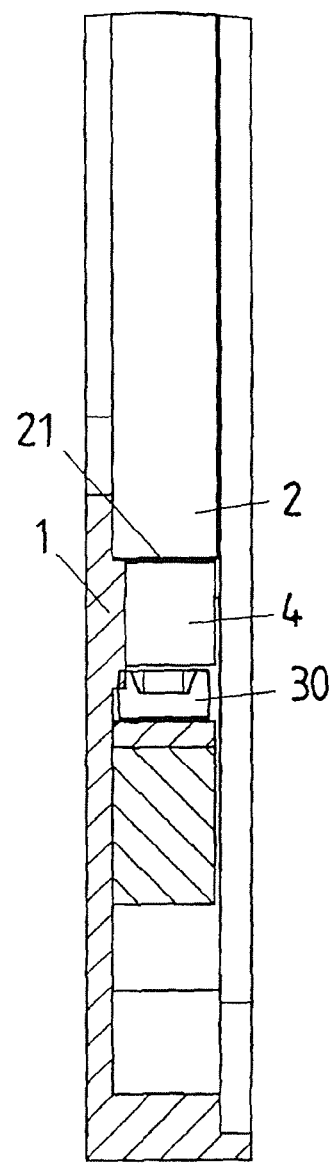
FIG. 4 shows an enlarged representation of the part IV of FIG. 3.

An apparatus for controlling or regulating the contrast range or dynamic range of an image recording light falling on an image recording medium, which is arranged as a structural unit and in particular as an attachment in front of the lens of a film-based or electronic recording means, such as a still camera, a motion picture camera or a video camera, is shown in FIG. 1 in a top view, in FIG. 2 in an enlarged detailed representation of the part II of FIG. 1, in FIG. 3 in a longitudinal section and in FIG. 4 in an enlarged detail view of the detail IV of FIG. 3.

The apparatus for controlling the contrast range consists of a frame 1 rectangular in this embodiment, which surrounds a light-permeable element constituting a glass pane 2. Alternatively, the frame 1 can be of the circular or cylindrical type and surround a circular glass pane. Vertical to the surface of the glass pane 2, i.e. vertical to the drawing plane, an image recording optical path proceeding from an object to be recorded extends through the lens of the image recording device to the image recording medium, which in the case of a film-based image recording device consists of a film to be exposed and in the case of an electronic image recording device of an electronic image sensor.

Uniformly distributed around the periphery of the rectangular glass pane 2 a plurality of light sources 3 are arranged, which emit a control light composed of three base colors R, G, B, which is coupled into the image recording optical path. In the embodiment shown in FIG. 1, two light sources 3 each are arranged one beside the other at the upper and lower edge of the glass pane 2, whereas one light source each is arranged at the right and left edge of the glass pane 2. The light sources 3 are composed of a plurality of partial light sources 30 which consist of individual light emitting diodes or LEDs emitting light of different color or wavelength. The light sources 3 arranged at the upper and lower edge of the glass pane 2 contain a greater number of LEDs, in the present embodiment twice as many LEDs as the light sources 3 arranged at the right and left edge of the glass pane 2.

The LEDs in particular emit light with the base colors R (red), G (green) and B (blue), wherein the number of LEDs 30 emitting light of the same color or wavelength depends on the respectively desired spectral distribution of the control light. For example, the light sources 3 arranged at the upper and lower edge each can contain two red LEDs, two green and four blue LEDs, whereas the light sources 3 arranged at the right and left edge of the glass pane 2 each consist of one red, one green and two blue LEDs.

Between the edge 21 of the glass pane 2 and the light sources 3 one diffuser 4 each is arranged, which serves a rather uniform distribution of light within the glass pane 2 and can be provided optionally.

To each of the light sources 3 an electronic board 5 is associated, which contacts the LEDs 30 of the light sources 3 separately by colors, i.e. by the light of different wave-length each emitted by the LEDs 30.

In a frame expansion 10 at the right-hand upper corner of the frame 1 a contrast control unit 6 is arranged, which is connected with the electronic boards 5 of the light sources 3 and which controls the brightness, i.e. the brightness of the individual LEDs 30 emitting the base colors. Details on the actuation of the LEDs 30 will be explained below with reference to the block circuit diagram shown in FIG. 5.

A switch 9 provided at the frame expansion 10 serves to switch the contrast control device on and off.

An arc-shaped web or stirrup 11 at the left edge of the frame 1 serves as a handle for inserting and removing the contrast control unit in guiding grooves of an attachment, such as a compendium, which is connected with the lens of the image recording device.

The connection of the frame 1 with the arc-shaped web or stirrup 11 represents only one of several possible embodiments. Alternatively, the frame 1 can also constitute a clamping or backloading frame, which for example by means of a latching device is connected with a compendium or by means of a bayonet lock with a film holder.

Figure 5:
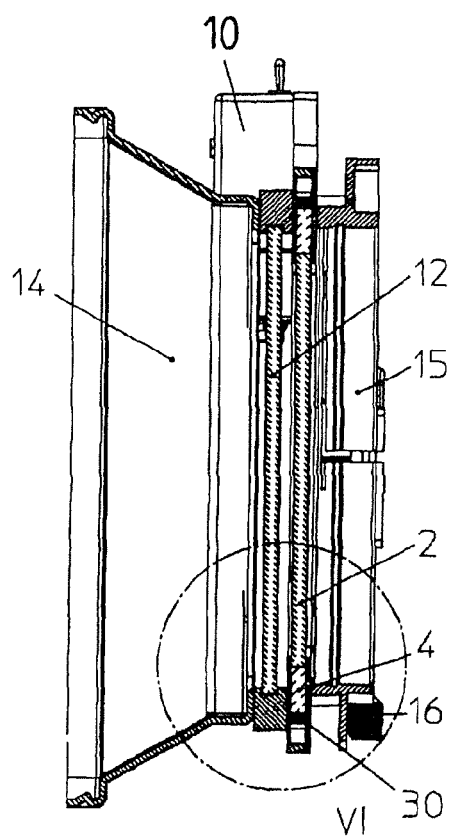
FIG. 5 shows an apparatus for controlling the contrast range of the image recording light falling on an image recording medium, which is integrated in a filter holder, according to FIGS. 1 and 2.
Figure 6:
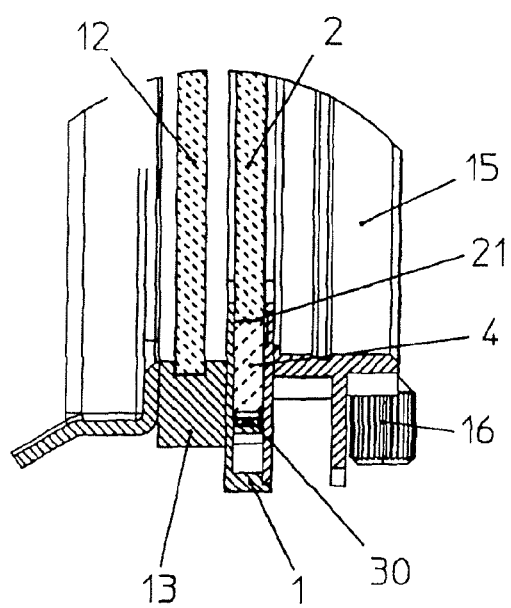
FIG. 6 shows an enlarged representation of the part VI of FIG. 5.

In a longitudinal section and in an enlarged partial view, respectively, FIGS. 5 and 6 show the integration of the contrast control unit in a structural unit together with a filter holder 13, a sunshade 14 and a fastening means 15.

The structural unit can be attached to the lens of the image recording device by means of fastening means 15 and a clamping device 16, wherein in the embodiment shown in FIGS. 5 and 6 the clamping device consists 16 of a clamping screw, which creates a frictional and/or positive connection with the lens.

The filter holder 13 accommodates a filter 12, preferably a neutral-density filter (ND-filter), which increases the flexibility of the contrast control unit in use as an attachment in front of the lens of an image recording device. The additional advantage when using an ND-filter consists in that the contrast range of the lens can be lowered when the contrast of the recording scene exceeds the working range of the contrast control unit, so that the contrast again falls in the working range of the contrast control unit.

The sunshade 14 arranged on the light entry side of the image recording optical path in conjunction with the fastening means 15 provides for a universal use of the apparatus for controlling the contrast range for any type of image recording device, so that its use is not limited to the connection with a compendium, which is connected with the housing of an image recording device for example via iris rods.

The arrangement, configuration and function of the apparatus for controlling the contrast range with a filter holder and a sunshade correspond to those of the apparatus for controlling the contrast range as described above with reference to FIGS. 3 and 4.

The mode of operation of the apparatus for controlling the contrast range as shown in FIGS. 1 to 6 will be explained below with reference to the block circuit diagram of the contrast control unit 6 shown in FIG. 7 and with reference to the grey scale diagram shown in FIG. 8 and the bar diagram shown in FIG. 9.

Figure 7:
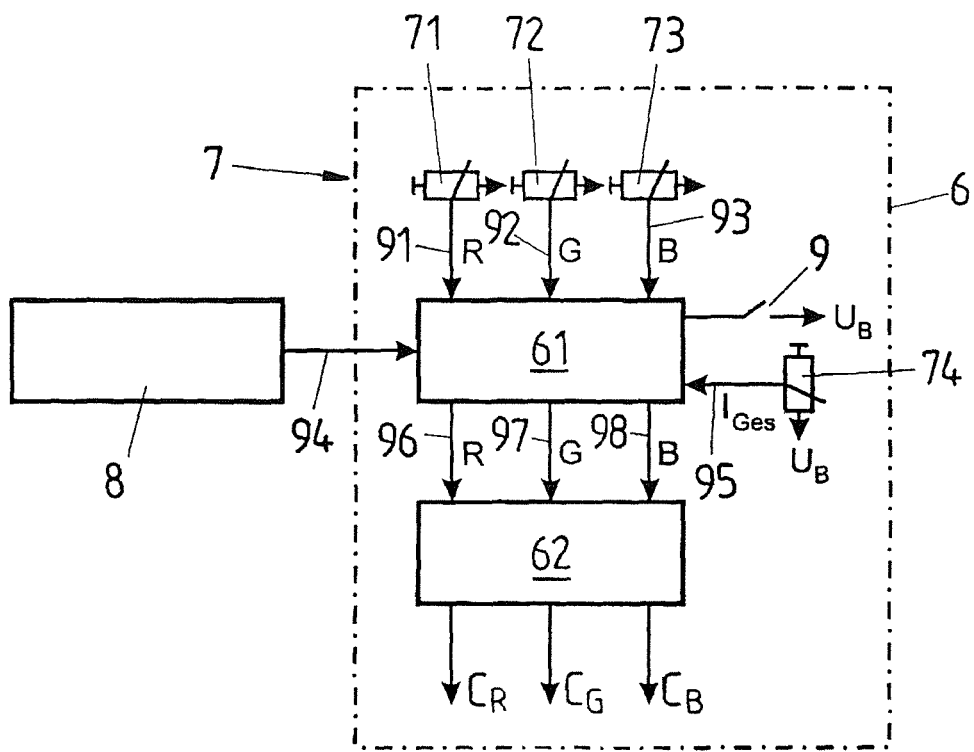
FIG. 7 shows a block circuit diagram of a contrast control unit for actuating partial light sources or LEDs of the light sources.
Figure 8:
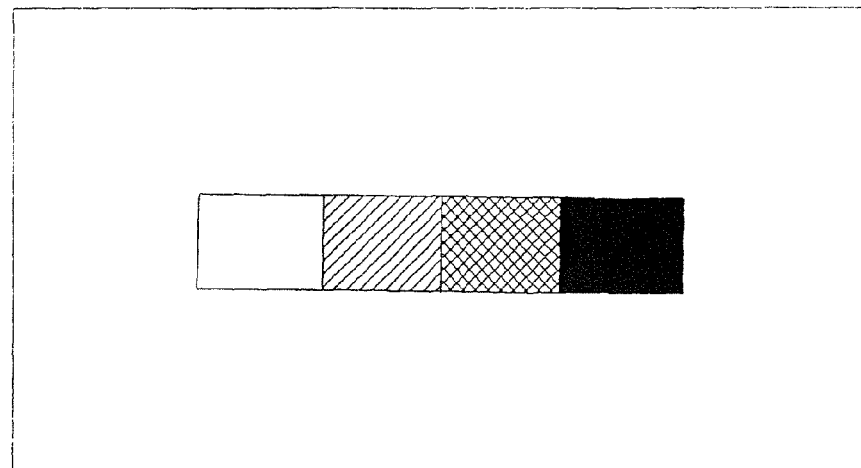
FIG. 8 shows a grey scale representation.

Framed with a dash-dotted line, the block circuit diagram shown in FIG. 7 shows the contrast control unit 6 for actuating the individual color LEDs 30 of the light sources 3 by means of control signals $C_R$, $C_G$, $C_B$, which is arranged in the frame expansion 10 of the frame 1 of the apparatus for controlling the contrast range. The contrast control unit 6 contains a central control unit 61, in which nominal values for the brightness of the individual color LEDs 30 of the light sources 3 are stored, which emit the base colors R, G, B for the light mixture of the light emitted by the light sources 3, for example the base colors red, green and blue. The adjustment of the nominal values is effected via a presetting unit 7 with a number of potentiometers 71, 72, 73 corresponding to the number of base colors R, G, B, i.e. in the illustrated embodiment three potentiometers for the individual base colors red R, green G and blue B, which are connected with signal inputs of the central control unit 61.

Via a serial interface or a wireless interface 94, the central control unit 61 is connected with an external control unit 8, which specifies the light flux portion of the individual base colors R, G, B of the control light emitted by the contrast control device and hence the brightness of the individual base colors R, G, B, which are emitted by the LEDs 30 of different color of the light sources 3. The external control unit 8 stores the spectral sensitivity curves of different image recording media, for which the contrast control device for controlling the contrast range is used, and hence specifies the best spectral distribution for the control light for the respectively used image recording medium for controlling the contrast range of the image recording medium.

The external control unit 8 can be configured as an electronic device with discrete circuitry or can consist of a computer, palmtop or the like, which is operated with a corresponding software.

The external control unit 8 can be provided optionally or as an alternative to the potentiometers 71, 72, 73 of the presetting unit 7 for specifying the light flux portions of the base colors R, G, B, which are connected with the central control unit 61 via the signal inputs 91, 92, 93, or for correspondingly actuating the LEDs 30 emitting the base colors R, G, B. With an optional arrangement of the external control unit 8, a spectral distribution deviating from the standard specification of the external control unit 8 can additionally be adjusted by means of the potentiometers 71, 72, 73 for the composition of the control light emitted by the contrast control unit 6, i.e. for the individual light flux portions of the base colors R, G, B.

Via a further signal input 95, the central control unit 61 is connected with a potentiometer 74 connected to a voltage source $U_B$, in general the accumulator of the image recording device, by means of which the total brightness of the control light emitted by the central control unit 61 can be adjusted by outputting a total current value $I_{Ges}$. This adjustment depends on the brightness differences of the object to be recorded and thus depends on the motif and the contrast range or dynamic range of the image recording medium.

For switching the contrast control device on and off, the switch 9 mentioned already in conjunction with the top view of the contrast control device according to FIG. 1 is used, which connects the central control unit 61 with the voltage source $U_B$.

Via a number of control lines 96, 97, 98 corresponding to the number of base colors R, G, B of the contrast control device, the output of the central control unit 61 is connected with a driver stage 62, which converts the control signals emitted by the central control unit 61 for the individual LEDs into the currents or actuation signals $C_R$, $C_G$, $C_B$ required for the LEDs 30. Within the driver stage 62, the current delivered to the LEDs 30 is regulated to the desired value by means of a constant-current source, wherein a quasi constant current optionally can also be generated by a pulse pause or pulse width modulation for saving energy. The switching frequency of the pulse pause or pulse width modulation is very much higher than the image recording frequency of the image recording device, in order to avoid brightness fluctuations in the recorded image.

When reducing the contrast range of the image generated by the object to be recorded by independent adjustment of the individual base colors R, G, B, the contrast range of the image to be recorded can be adapted to the dynamic range of the image recording medium, so that details of the image to be recorded can be recognized both in the dark and in the light image regions. By selective variation of the base colors R, G, B, whose dynamics go beyond the admissible range, the region of the adaptation of the contrast range of the image recording medium to the contrast range of the image to be recorded can distinctly be increased as compared to the known contrast reduction methods.

In the method of the invention, an amount of light split up by the individual base colors R, G, B is added by the contrast control device to the image recording optical path as uniformly distributed as possible over the entire image region, which will be explained with reference to the grey scale schematically represented in FIG. 8, which on the left shows a white field, beside the same a light-grey one (hatched), then a dark-grey one (cross-hatched) and finally on the right a black field. For better illustration, the grey scale represents each of the base colors R, G, B to be controlled with the contrast control device of the invention.

When such grey scale or color scale is recorded with a still camera or a motion picture camera which uses either a film to be exposed or an electronic image sensor as image recording medium, the grey or color scales are converted into a negative image on the film or into a charge image on the image sensor by means of the lens. For example, an electronic image sensor generates a digital output signal from the image to be recorded by using the grey scale, for which the following brightness values would be obtained for the individual surfaces of the grey scale due to the different brightnesses:

|  | White | Light Grey | Dark Grey | Black |
|---|---|---|---|---|
| Pixel value | 2000 | 200 | 20 | 2 |

This results in a contrast range of 2000 (white field):2 (black field) and 1000:1, respectively. Assuming a dynamic range of the electronic image sensor of 500:1, it follows that either the black or the white field or both the black field and the white field are not represented exactly. Low-contrast structures within the white or black field or within both fields would no longer be represented with the output signals of the electronic image sensor.

If a uniform light portion of e.g. six units is put over the entire image region of the grey scale by means of the contrast control device, the following Table is obtained:

|  | White | Light Grey | Dark Grey | Black |
|---|---|---|---|---|
| Pixel value | 2000 | 200 | 20 | 2 |
| Control light | 6 | 6 | 6 | 6 |
| Sum | 2006 | 206 | 26 | 8 |

This results in a contrast range of 2006 (white field):8 (black field) or approximately 250:1, so that by adding the control light the contrast range of the image to be recorded by the electronic image sensor has been shifted into the dynamic range of the electronic image sensor of 500:1.

The above numerical values merely are chosen to describe the situation and should by no means represent the situation in a specific sensor, since these values differ considerably from sensor to sensor.

The above example also shows that by selective addition of portions of the control light split up by the base colors R, G, B an optimum adaptation to the dynamic range of the image recording medium is possible, since with a corresponding adjustment of the units to be added by the control light in the light portion of the entire control light the dynamic range of the image recording medium can be utilized much better than is the case in the preceding example. By corresponding adaptation of the nominal values for the brightness of the base colors R, G, B or for the light flux portions of the base colors R, G, B in the light mixture of the control light to the spectral sensitivity of the image recording medium, an optimization of the image to be recorded in consideration of the contrast range of the image recording medium thus is ensured.

Figure 9:
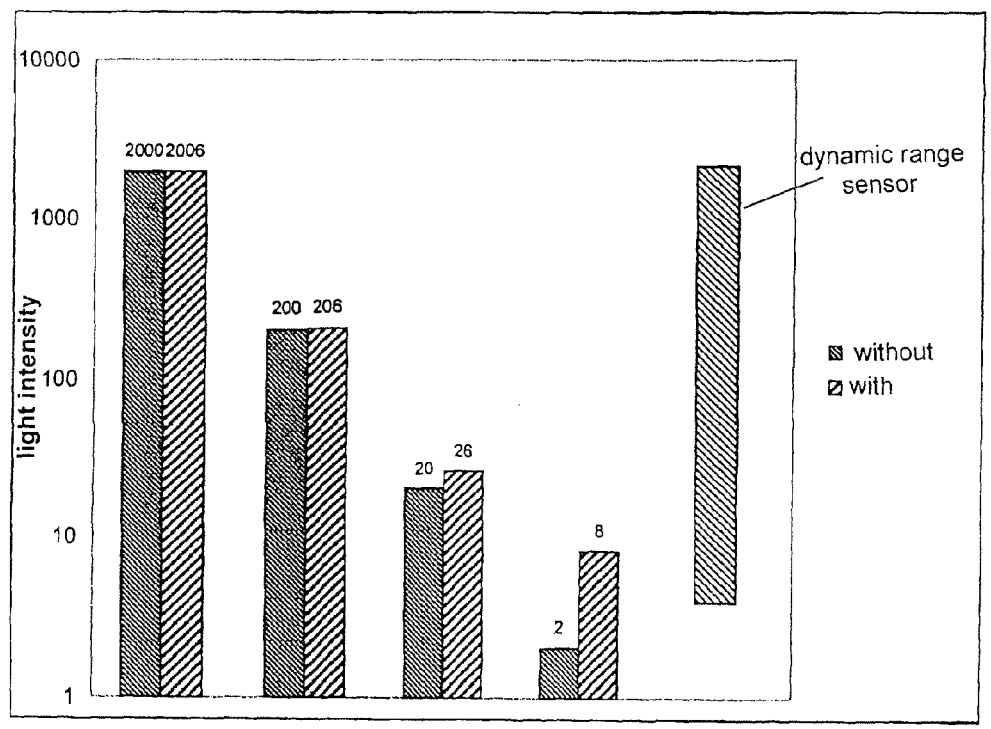
FIG. 9 shows a comparative bar diagram of the contrast range of an image recording medium with and without apparatus for controlling the contrast range of the image recording light falling on the image recording medium.

FIG. 9 shows a schematic bar diagram of the contrast range or dynamic range of an electronic image sensor with different light intensities each without and with a contrast control unit in the case of an addition of six units of the control light to the image recording optical path as assumed in the preceding embodiment. This representation illustrates the adaptation and increase of the contrast range by using a contrast control device as compared to the physically specified dynamic range of the electronic image sensor without using a contrast control device.

Figure 10:
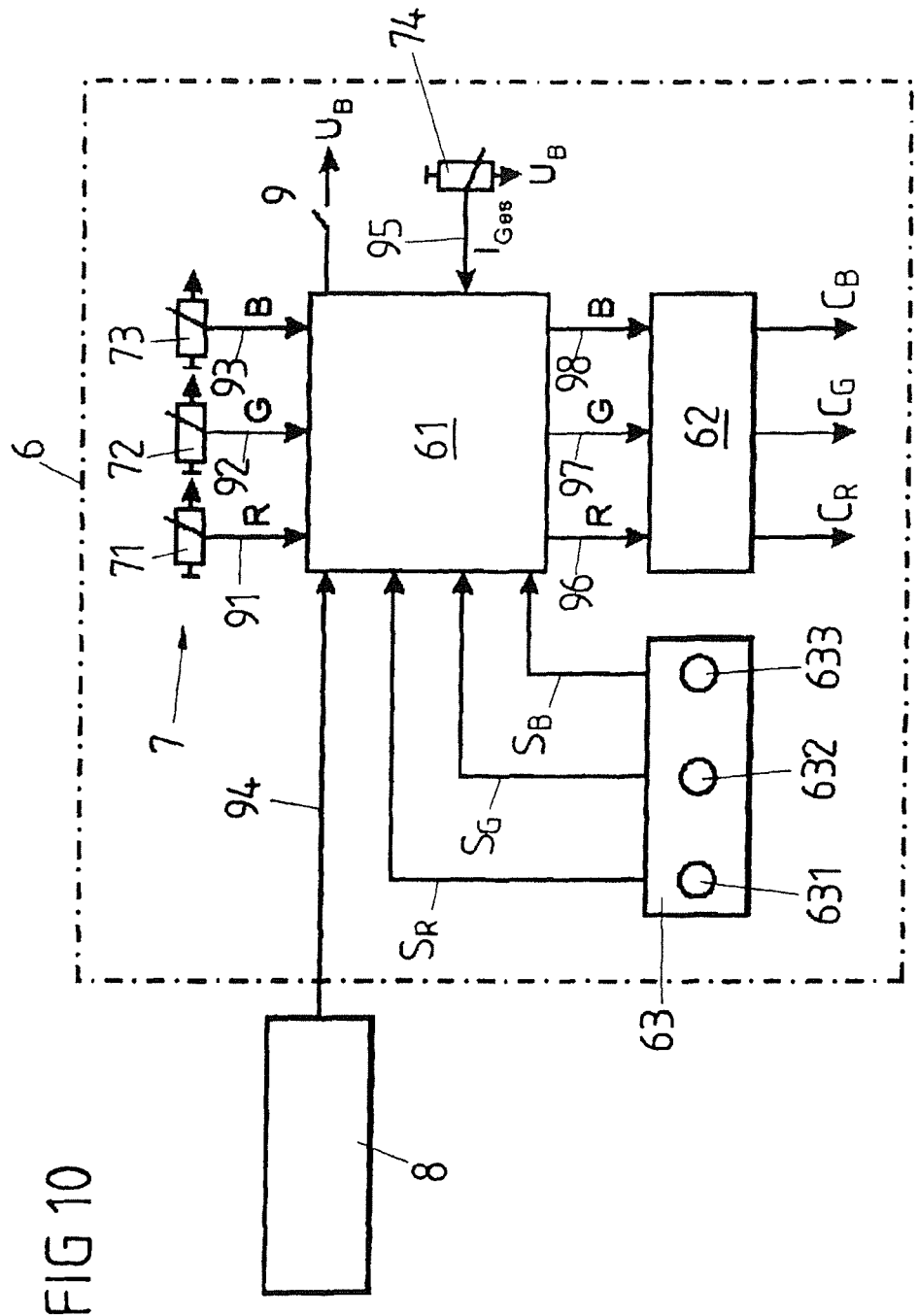
FIG. 10 shows a block circuit diagram of a contrast regulating unit with sensors for determining the brightness of the individual base colors and for actuating the partial light sources or LEDs of the light sources.

FIG. 10 shows a block circuit diagram of an expansion of the contrast control unit represented in FIG. 7 by means of a block circuit diagram to a contrast regulating unit.

The contrast regulating unit of FIG. 10 differs from the contrast control unit of FIG. 7 by the additional arrangement of a sensor means 63 with a number of sensors 631, 632, 633 corresponding to the number of base colors, which determine the actual value of the brightness of the individual base colors and provide the same as actual values of the base color brightness $S_A$, $S_G$, $S_B$ of the individual base colors to the central control unit 61. The individual sensors 631, 632, 633 determine the brightness of the base colors emitted by the individual partial light sources within the light-permeable element or the glass pane or are oriented at right angles thereto in the direction of the image recording means, i.e. parallel to the image recording optical path.

By expanding the contrast control unit to a contrast regulating unit, differences in the light sources of the contrast control unit can be detected and compensated, so that independent of the respective structural unit used a standardization of the contrast regulating units is ensured.

The invention claimed is:

1. A method for controlling the contrast range of an image recording light falling on an image recording medium by means of control light coupled to a light-permeable element which is arranged on an image recording optical path in front of a lens of an image recording device, wherein said control light comprises several base colors whose brightness is adjustable independent of each other,
wherein the brightness at least of said base colors of the control light is varied, wherein dynamics in a recorded image go beyond the admissible dynamic range.

2. The method according to claim 1, wherein at least one of a standard setting of the control light nominal values for the brightness of the base colors and light flux portions of the base colors in a light mixture of the control light are stored in dependence on a spectral sensitivity of the image recording medium.

3. The method according to claim 2, wherein a spectral distribution of the control light differing from the standard setting is adjusted by entering nominal correction values.

4. The method according to claim 1, wherein a total brightness of the control light comprising the base colors is adjusted in dependence on an object to be recorded and a contrast range of the image recording medium.

5. The method according to claim 1, wherein the brightness of the individual base colors of the control light on the image recording medium and deviations from nominal values are corrected.

6. The method according to claim 1, wherein at least one of the brightness and light flux portions of the base colors of the control light is/are adjusted by pulse-pause or pulse-width-modulated control of an electrical power supplied to partial light sources, wherein a frequency of the pulse-pause or pulse-width modulation of the control light is higher than the image recording frequency.

7. An apparatus for controlling the contrast range of an image recording light falling on an image recording medium with a light-permeable element which is arranged on an image recording optical path in front of a lens of an image recording device and in which control light emitted by at least one light source can be coupled in, which apparatus comprises at least a number of partial light sources corresponding to a number of base colors of the control light which are connected with a central control unit of a contrast control unit for independently controlling a brightness at least of those partial light sources whose dynamics in a recorded image go beyond an admissible dynamic range, and for storing at least one nominal value of the brightness of the individual base colors emitted by the partial light sources and of light flux portions of the individual base colors in a light mixture of the control light.

8. The apparatus according to claim 7, wherein signal inputs of the central control unit are connected with a presetting unit which provides at least one of the nominal values of the brightness for the base colors and a spectral distribution of the brightness of the base colors suitable for the image recording medium to the central control unit.

9. The apparatus according to claim 8, wherein the presetting unit comprises potentiometers associated with the base colors or an external control unit in which the spectral color sensitivity of various image recording media are stored and which provides a selected spectral distribution associated with the image recording medium with the central control unit.

10. The apparatus according to claim 7, wherein an output of the central control unit is connected with a driver stage which is connected to a constant-current source or includes a constant-current source and which regulates a current delivered to the partial light sources in dependence on the control signals provided by the central control unit to the driver stage.

11. The apparatus according to claim 7, wherein the light source comprises an LED emitting white light or the partial light sources comprise LEDs emitting white light, which internally generate light in base colors red, green and blue, and wherein the light generated in the base colors is mixed to obtain white light.

12. The apparatus according to claims 7, wherein the light-permeable element comprises a glass pane and a plurality of light sources are distributed around a periphery of the glass pane and couple the control light into the plane of the glass pane such that at least part of the control light is reflected into the image recording optical path.

13. The apparatus according to claim 12, further comprising a diffuser arranged between each light source and an edge of the glass pane.

14. The apparatus according to claim 7, wherein the central control unit is connected with a sensor means which comprises a number of sensors corresponding to the number of base colors which detect the control light of the partial light sources coupled into the light-permeable element or the control light reflected into the image recording optical path and provide sensor signals corresponding to the base colors to the central control unit.

15. The apparatus according to claim 7, wherein the partial light sources comprises light emitting diodes or LEDs, semiconductor lasers, the base colors emitted by a multicolor light emitting diode or a plurality of filter elements filtering out the base colors and a common light source emitting a light mixture.

16. The apparatus according to claim 7, wherein at least the light source or the partial light sources and the light-permeable element are combined to a structural unit arranged in front of the lens, wherein said structural unit comprises a frame enclosing the light-permeable element and containing the light source or the partial light sources, which is attachable to the lens or to a compendium connected with the image recording device and/or with the lens or a filter holder containing a filter and on a light entry side comprises a sunshade or is connected with a sunshade.

17. The apparatus according to claim 16, wherein the filter is a neutral-density filter.

18. A method for controlling the contrast range of an image recording light falling on an image recording medium by means of control light coupled into an optical path of the image recording light, wherein said control light comprises several base colors whose brightness is adjustable independent of each other, wherein the brightness at least of said base colors of the control light is varied, and wherein dynamics in a recorded image go beyond the admissible dynamic range, wherein at least one of a standard setting of the control light nominal values for the brightness of the base colors and light flux portions of the base colors in the light mixture of the control light are stored in dependence on a spectral sensitivity of the image recording medium.

19. The method according to claim 18, wherein a spectral distribution of the control light differing from the standard setting is adjusted by entering nominal correction values.

20. A method for controlling the contrast range of an image recording light falling on an image recording medium by means of control light coupled into an optical path of the image recording light, wherein said control light comprises several base colors whose brightness is adjustable independent of each other, wherein the brightness at least of said base colors of the control light is varied, wherein dynamics in a recorded image go beyond the admissible dynamic range, and wherein at least one of the brightness and light flux portions of the base colors of the control light is/are adjusted by pulse-pause or pulse-width-modulated control of an electrical power supplied to partial light sources, wherein a frequency of the pulse-pause or pulse-width modulation of the control light is higher than an image recording frequency.

* * * * *